No. 749,788. PATENTED JAN. 19, 1904.
G. B. GROVER.
MACHINE FOR ASSEMBLING HEEL BLANKS.
APPLICATION FILED MAY 22, 1902.
NO MODEL. 3 SHEETS—SHEET 1.
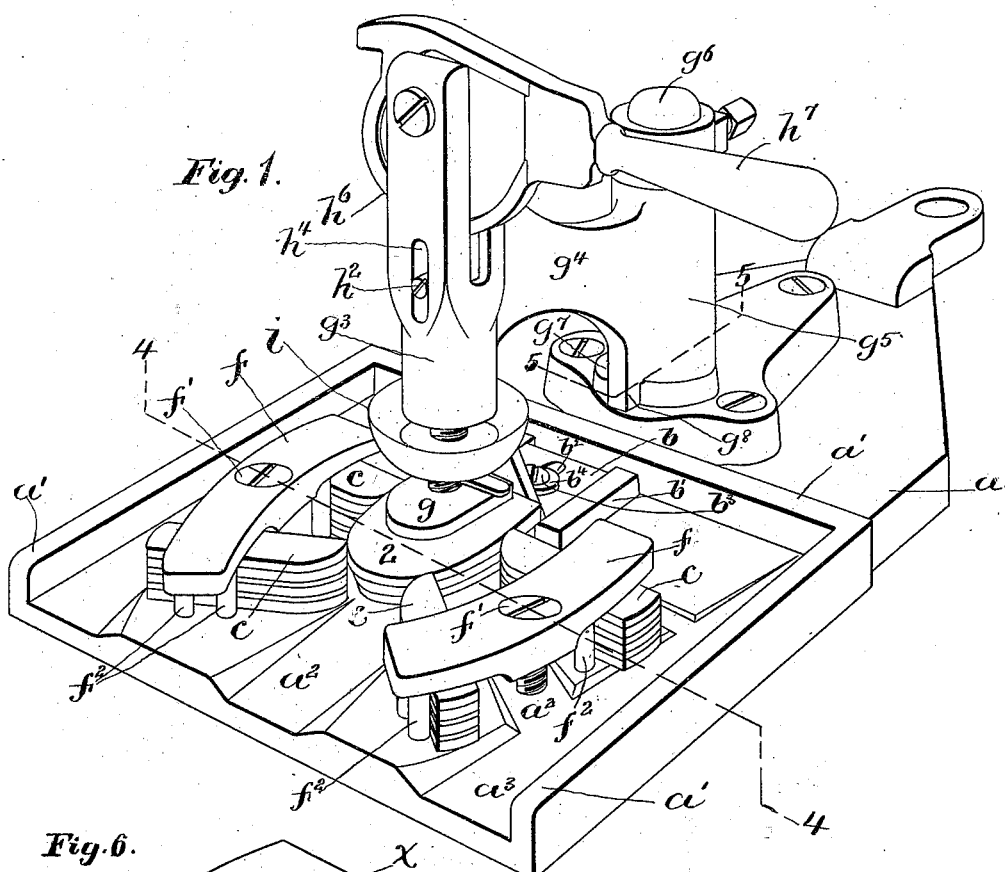
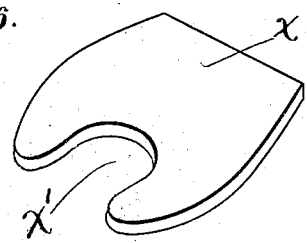
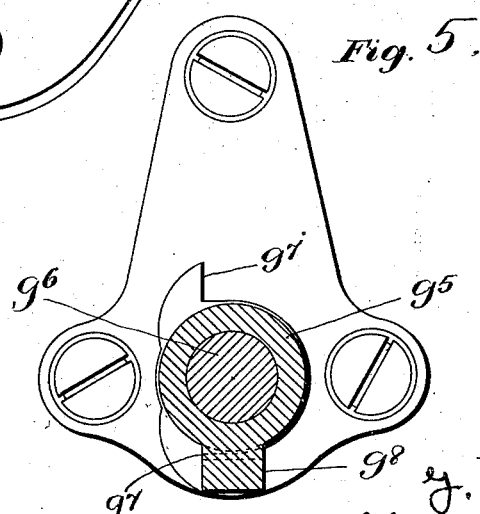
Witnesses:
C. C. Stecher
A Keyser
Inventor:
G. B. Grover
by Wright Brown & Quinby
Attys.

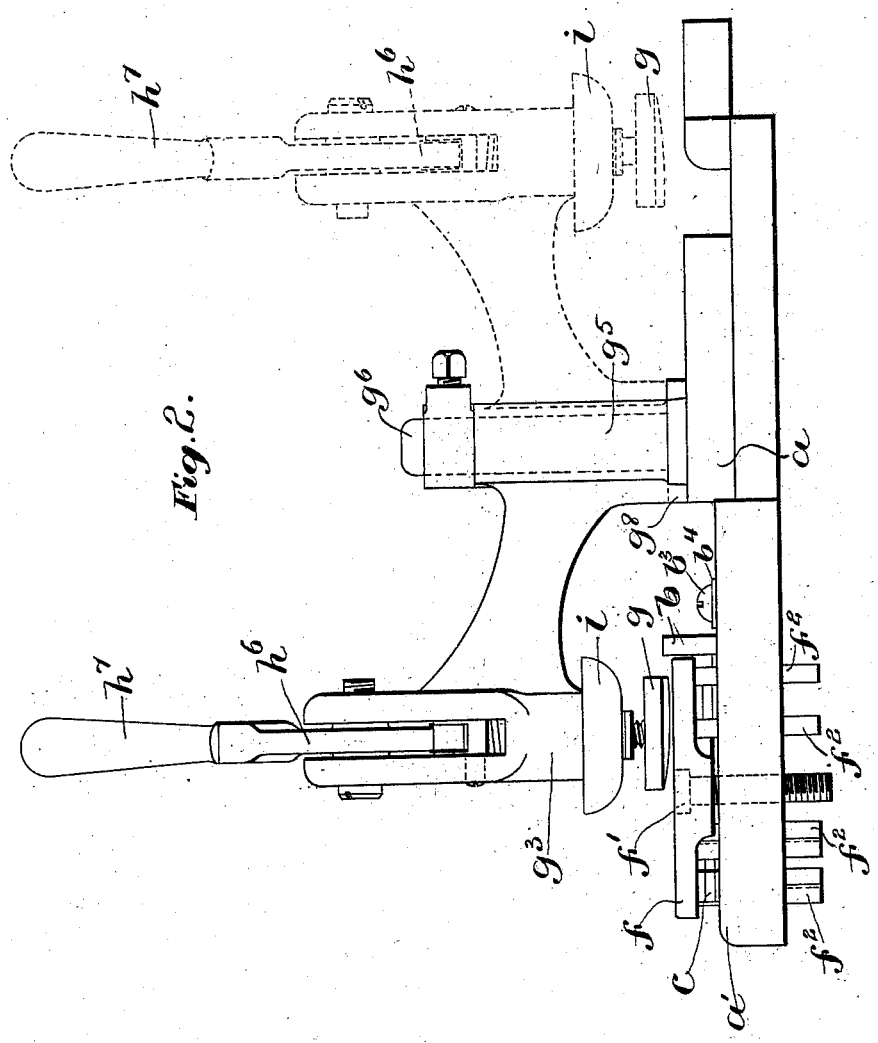

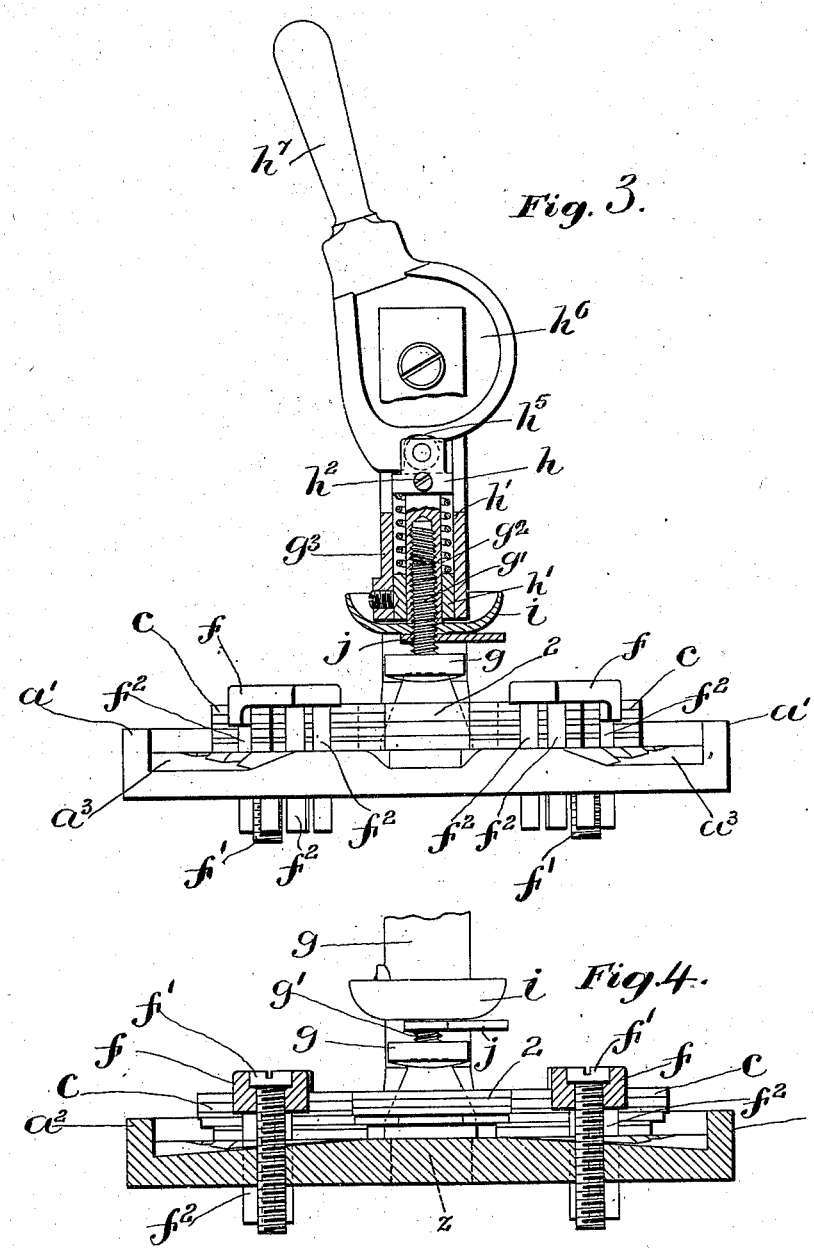

No. 749,788. Patented January 19, 1904.

UNITED STATES PATENT OFFICE.

GEORGE B. GROVER, OF LYNN, MASSACHUSETTS, ASSIGNOR OF ONE-HALF TO CHARLES E. HARWOOD, OF LYNN, MASSACHUSETTS.

MACHINE FOR ASSEMBLING HEEL-BLANKS.

SPECIFICATION forming part of Letters Patent No. 749,788, dated January 19, 1904.

Application filed May 22, 1902. Serial No. 108,489. (No model.)

*To all whom it may concern:*

Be it known that I, GEORGE B. GROVER, of Lynn, in the county of Essex and State of Massachusetts, have invented certain new and useful Improvements in Machines for Assembling Heel-Blanks, of which the following is a specification.

Heretofore it has been customary in the making up of heel-blanks out of cheap materials to employ hollow wooden forms of interior contour corresponding with that which the blanks are to have, a great number and variety of such forms being kept in stock to meet the various requirements as to shape and size of product. In making up a heel-blank with one of these forms the previously diedout pieces of cheap material are placed one by one in the form with an application of glue between superposed surfaces and a clamp is brought to bear upon the structure thus built up, the form resting upon a suitable base. This system has been found quite objectionable, owing to the difficulty of keeping the hollow forms in proper condition when paste or glue has to be freely employed in them, and the destructibility of the forms and their proneness to become unfit for use has proven a serious source of loss in the manufacture of heel-blanks.

The present invention contemplates the elimination of the hollow forms or molds and the provision of means for manufacture of heel-blanks which shall be entirely free from the objections above mentioned; and in furtherance of this object I propose to employ a form-outlining structure adjustable to any contour of heel-blank desired, which structure can be employed for all the purposes of the hollow molds heretofore used and will not deteriorate under any amount of glue or paste used to secure together the material of which the heel-blanks are composed.

To this end the invention consists in certain novel features of construction and combinations of parts, the essential elements of which are recited in the appended claims and a preferred form of embodiment of which is specifically described hereinafter and illustrated in detail in the accompanying drawings, whereof—

Figure 1 represents the complete machine in perspective. Fig. 2 represents the same in side elevation. Fig. 3 is a sectionalized front elevation. Fig. 4 is a cross-section taken on the line 4 4 of Fig. 1. Fig. 5 is a horizontal section on line 5 5 of Fig. 1, the scale being enlarged. Fig. 6 is a perspective view of a loose bottom rest-plate for the heel-blank. Each of said plates at its inner end is approximately pointed or narrow, so as to bear upon or contact with a heel-blank at practically only a single point.

In the drawings the reference-letter $a$ designate a base-plate or table of considerable lateral extent, the front half having a raised edge $a'$, extending along the back and sides, and a number of channels or drainways $a^2$ in the bottom radiating from a central space, owing to the pointed inner ends of the plates, and deepening as they extend therefrom, the one at the front opening out of the front edge of the table and those at the sides of said space leading into other drainways $a^3$, which extend from the back of the inclosure along the side walls thereof and open out of the front edge. The central space referred to presents a flat surface, above which the heel-blanks are built up, and around this central space I arrange the adjustable parts which determine the outline of the blanks. At the rear of this forming-space where the breast side of the heel-blank comes and no irregular contour is called for I mount a back rest $b$ between guide-strips $b'$ on the table and provide for its forward and backward adjustment by a longitudinal slot $b^2$ in its base and a clamping-screw $b^3$ and washer $b^4$. Around the sides of the forming-space I arrange a number of piles of small plates $c$, preferably long and narrow in form, varying in thickness and rounded at the inner ends on one side. I have here shown two piles of such plates at each side of the central space and radially disposed with relation thereto, these piles resting upon the raised surfaces of the base between the drainways and designed to be clamped thereon in pairs. Each clamp comprises a curved bar $f$, spanning the two piles, a screw $f'$, passing loosely through its middle and entered through a threaded hole in the base, and two sets of guide-pins $f^2$, slidingly engaging holes in the base and constituting side rests for the plates $c$. When the clamps are loosened, the plates can be adjusted independently and their inner ends caused to conform with any desired outline of heel-blank, and this will be determined by the selection of a templet or pattern such as designated by the numeral 2, which is set in the central space. A stock of such templets will be kept in hand of various shapes, according to the variety of heel-blanks called for, and they can be cheaply made of wood. The number of independently-adjustable pieces $c$ and their varying thickness allows great latitude in adaptability to different patterns, and of course it will be understood that the piles may be variously made up as to number and character of pieces.

A top clamp is employed both to hold the templet in place while adjusting the plates and for pressing the heel-blank parts together, this clamp comprising a plate $g$, having a screw-threaded stem $g'$, Fig. 3, engaging a screw-threaded sleeve $g^2$, fitted to slide in a tubular head $g^3$ on the inner end of a horizontally-swinging arm $g^4$, whose boss $g^5$ journals upon a post $g^6$, which is erected on the rear part of the table $a$, the base of said post having shoulders $g^7$, Fig. 5, and the boss $g^5$ a depending lug $g^8$ to encounter the same and limit the swinging movement of the clamp-carrier. The clamp-sleeve $g^2$ carries a collar $h$ and a spiral spring $h'$, interposed between the same, and a collar $h^2$, secured in the lower end of the head $g^3$, serves to hold the clamp in an elevated position. Said collar $h$ has a stud $h^2$, working in a guide-slot $h^4$ in the head $g^3$, and a small roller $h^5$, engaged by a cam $h^6$, pivoted in a bifurcation of the head and formed with a handle $h^7$. It will be seen that by turning down the latter the clamp-plate can be depressed against the stress of the spring $h'$ and brought to bear upon the templet or upon the heel-blank structure, the desired concavity in the seat of the latter being provided for by a convexity of the bottom surface of said plate. An oil-cup $i$ is preferably compounded with the sleeve $g^2$, and a lock-nut $j$ engages the stem $g'$ to secure the clamp-plate in different adjustment.

The *modus operandi* will be sufficiently apparent from what has already been set forth to require but brief review. With the top clamp-carrier swung to the rear, as shown by broken lines in Fig. 2, and the adjustable form pieces retracted and released a templet is selected and placed in the central space of the table. The back rest is adjusted to the rear side of the templet, and the top clamp is brought around to the front and pressed down upon the templet. Then the plates $c$ are suitably adjusted to the contour of the templet by engaging their inner ends therewith, and the clamps $f$ are tightened, after which the top clamp is released and swung to the rear, the templet is removed, and the machine is ready for the manufacture of the heel-blanks. The died-out sheets of material for the blank are superposed in the space previously occupied by the templet accompanied by the necessary complement of paste or glue, and the top clamp is again brought forward and pressed down upon the heel-blank structure. Surplus paste will drain off through the channels $a^2$ and $a^3$, and the making of heel-blanks can be carried on indefinitely without repreparation of the form-controlling pieces except of course when a different pattern of heel-blank is wanted.

Obviously if the inner ends of the plates $c$ were relatively wide and concaved from end to end of their inner edges the heel-blank structure would to a considerable extent partake of the form or contour of such concave edges, and thus render it impossible to outline the form according to any desired templet.

An opening through the center of the table and indicated by dotted lines $z$ in Fig. 4 gives access to the bottom of the heel-blank for driving a nail through the same.

A loose metal plate $x$ may be employed as a bottom rest for the blank in order to raise it from the accumulation of glue on the table, this being resorted to more especially in the case of spring-heels, and the said plate having a reëntrant opening $x'$ to give access to the nail-driving means.

The form-outlining pieces will preferably be made of metal as best adapted to the assemblage and adjustment called for by the invention and least likely to be affected by adherence of paste or glue.

It will be seen that the construction here shown and described is well calculated to thoroughly fulfil the objects primarily stated; but it must be understood that the invention is capable of embodiment in various other forms, and I do not, therefore, limit myself in the claims which follow to any one species.

Having thus explained the nature of my invention and described a way of constructing and using the same, though without attempting to set forth all of the forms in which it may be made or all of the modes of its use, what I claim, and desire to secure by Letters Patent, is—

1. In a machine of the character described, a plurality of sets of separately-adjustable members arranged on each side of a central forming-space, and a clamp for each pair of sets of members, said clamps being each provided with depending guide-pins adapted to form side rests for each of said sets of members.

2. In a machine of the character described, a plurality of sets of separately-adjustable members arranged on each side of a central forming-space and having pointed inner ends, a clamp for holding each pair of sets of separately-adjustable members, said clamp being provided with a set of guide-pins for each pair of members, the said guide-pins having an engagement with the base of the machine.

3. In a machine of the character described, a plurality of sets of separately-adjustable pointed members arranged about a central forming-space, an adjustable back rest forming a part of said central forming-space, clamps arranged to retain the sets of members in pairs in the desired position, said clamps comprising a curved bar spanning two of the sets of members and having a screw engagement with the base of the machine and being provided with sets of guide-pins having a sliding engagement with the base of the machine and forming side rests for each of the said sets of members.

4. In a machine of the character described, a plurality of sets of separately-adjustable pointed members arranged about a central forming-space, and clamping mechanism comprising a curved bar spanning two of the sets of members and being provided with sets of guide-pins having an engagement with the base of the machine, said sets of guide-pins being arranged near each end of the curved-bar portion whereby side rests for each of the sets of members are formed.

5. In a machine of the character described, a base having mounted thereon means for holding the material in the desired position, a tubular head having extended therefrom a horizontal arm, said arm being connected to the base of the machine to have a swinging movement, means for limiting the swinging movement, a sleeve slidingly mounted within the tubular head, and being provided at its upper end with a collar, a collar mounted upon the interior of the tubular head at its bottom portion, a spring interposed between said lower collar and upper collar, a stud extending from the upper collar through a guide-slot in the tubular head, a roller mounted above said stud, said tubular head being bifurcated at its upper portion, and a cam-lever mounted in said bifurcated portion, whereby a downward movement of the cam-lever will depress the presser-plate against the stress of the spring.

6. In a machine of the character described, a base having arranged thereon a plurality of sets of separately-adjustable form-pieces, guide-strips upon said base, and an adjustable back rest mounted upon the base of the machine and between the said guide-strips.

In testimony whereof I have affixed my signature in presence of two witnesses.

GEORGE B. GROVER.

Witnesses:
MARCUS B. MAY,
C. C. STECHER.